(12) United States Patent
Xue et al.

(10) Patent No.: US 11,307,363 B2
(45) Date of Patent: Apr. 19, 2022

(54) FERRULE ASSEMBLY, METHOD FOR MANUFACTURING A FERRULE ASSEMBLY AND OPTICAL FIBER FIXING MOLD

(71) Applicant: COMMSCOPE TECHNOLOGIES LLC, Hickory, NC (US)

(72) Inventors: Dong Xue, Shanghai (CN); LiMing Wang, Shanghai (CN); Daokuan Zhang, Shanghai (CN); Jianfeng Jin, Shanghai (CN)

(73) Assignee: CommScope Technologies LLC, Hickory, NC (US)

( * ) Notice: Subject to any disclaimer, the term of this patent is extended or adjusted under 35 U.S.C. 154(b) by 426 days.

(21) Appl. No.: 16/341,298

(22) PCT Filed: Oct. 9, 2017

(86) PCT No.: PCT/IB2017/001387
§ 371 (c)(1),
(2) Date: Apr. 11, 2019

(87) PCT Pub. No.: WO2018/069765
PCT Pub. Date: Apr. 19, 2018

(65) Prior Publication Data
US 2021/0294046 A1    Sep. 23, 2021

(30) Foreign Application Priority Data
Oct. 11, 2016  (CN) .......................... 201610889090.3

(51) Int. Cl.
*G02B 6/38*    (2006.01)
*G02B 6/36*    (2006.01)

(52) U.S. Cl.
CPC ......... *G02B 6/3865* (2013.01); *G02B 6/3608* (2013.01); *G02B 6/3696* (2013.01);
(Continued)

(58) Field of Classification Search
None
See application file for complete search history.

(56) References Cited

U.S. PATENT DOCUMENTS 4,215,937 A    8/1980  Borsuk
4,330,171 A    5/1982  Malsot et al.
(Continued)

FOREIGN PATENT DOCUMENTS

CN    86104201 A    4/1987
CN    1526081 A     9/2004
(Continued)

OTHER PUBLICATIONS

International Search Report and Written Opinion of the International Searching Authority for International Patent Application No. PCT/IB2017/001387 datd Mar. 13, 2018, 18 pages.
(Continued)

*Primary Examiner* — Jerry Rahll
(74) *Attorney, Agent, or Firm* — Merchant & Gould P.C.

(57) ABSTRACT

The present disclosure provides a method for manufacturing a low loss ferrule assembly having prefabricated optical fibers, a low loss ferrule assembly having prefabricated optical fibers manufactured according to the method and an optical fiber fixing mold for manufacturing the ferrule assembly, wherein a method for manufacturing a high-precision ferrule assembly comprises: disposing both ends of a plurality of optical fibers within a plurality of grooves at both ends of an optical fiber fixing mold, such that the plurality of optical fibers maintain a specific distance therebetween; disposing the plurality of optical fibers within a housing, and causing the plurality of optical fibers to be fixed relative to the housing, wherein the housing is of a split type; cutting and polishing the optical fibers at a first side of the housing. The solution provided by the present disclosure implements the ferrule assembly of the high-precision opti- (Continued)

cal fiber connector with low costs. The method is simple and effective and has great use value.

23 Claims, 4 Drawing Sheets

(52) U.S. Cl.
CPC ............ *G02B 6/3839* (2013.01); *G02B 6/387* (2013.01); *G02B 6/3885* (2013.01)

(56) References Cited

U.S. PATENT DOCUMENTS

| | | | |
|---|---|---|---|
| 4,351,586 | A | 9/1982 | Phillips et al. |
| 4,482,201 | A | 11/1984 | Dousset |
| 4,738,508 | A | 4/1988 | Palmquist |
| 4,830,456 | A | 5/1989 | Kakki et al. |
| 5,206,921 | A | 4/1993 | Okada et al. |
| 5,339,376 | A | 8/1994 | Kakil et al. |
| 5,664,039 | A | 9/1997 | Grinderslev et al. |
| 5,993,070 | A | 11/1999 | Tamekuni et al. |
| 6,086,704 | A | 7/2000 | Kanai et al. |
| 6,328,479 | B1 | 12/2001 | Schofield et al. |
| 6,634,800 | B2 | 10/2003 | Suematsu et al. |
| 6,726,370 | B2 | 4/2004 | Shimotsu |
| RE43,542 | E | 7/2012 | Murray et al. |
| 9,563,027 | B2 | 2/2017 | Childers et al. |
| 2001/0051026 | A1 | 12/2001 | Steinberg et al. |
| 2002/0081084 | A1 | 6/2002 | Matsumoto |
| 2002/0118928 | A1 | 8/2002 | Roehrs et al. |
| 2002/0146216 | A1 | 10/2002 | Schofield et al. |
| 2002/0172490 | A1 | 11/2002 | Bonja |
| 2003/0002806 | A1 | 1/2003 | Kang et al. |
| 2005/0123248 | A1* | 6/2005 | Sakurai ............... B29C 45/2628 385/78 |
| 2006/0159402 | A1* | 7/2006 | Ammer ................ G02B 6/3809 385/71 |
| 2008/0181563 | A1 | 7/2008 | Akiyama |
| 2014/0169743 | A1 | 6/2014 | Hodge et al. |
| 2014/0205246 | A1 | 7/2014 | Li et al. |
| 2016/0011372 | A1 | 1/2016 | Barwicz et al. |
| 2016/0202430 | A1 | 7/2016 | De Jong et al. |
| 2017/0139151 | A1 | 5/2017 | Tong et al. |
| 2017/0139154 | A1 | 5/2017 | Tong et al. |
| 2017/0160492 | A1 | 6/2017 | Lin et al. |

FOREIGN PATENT DOCUMENTS

| | | |
|---|---|---|
| CN | 201464676 U | 5/2010 |
| CN | 201828690 U | 5/2011 |
| CN | 203299417 U | 11/2013 |
| CN | 203299418 U | 11/2013 |
| CN | 104181644 A | 12/2014 |
| CN | 104181645 A | 12/2014 |
| EP | 0 205 984 A1 | 12/1986 |
| EP | 0 747 740 B1 | 2/2003 |
| EP | 2 589 993 A1 | 5/2013 |
| GB | 2 215 082 A | 9/1989 |
| GN | 1361437 A | 7/2002 |
| JP | S58-108507 A | 6/1983 |
| JP | S58-152214 A | 9/1983 |
| JP | S64-17010 A | 1/1989 |
| JP | H01-96608 A | 4/1989 |
| JP | H01-300207 A | 12/1989 |
| JP | H05-119238 A | 5/1993 |
| JP | H06-34845 A | 2/1994 |
| JP | H08-334653 A | 12/1996 |
| JP | H10-160970 A | 6/1998 |
| JP | 2001-249249 A | 9/2001 |
| JP | 2002-023018 A | 1/2002 |
| JP | 2002-040294 A | 2/2002 |
| JP | 2008-046433 A | 2/2008 |
| JP | 2012-037573 A | 2/2012 |
| JP | 2012-185283 A | 9/2012 |
| WO | 86/06504 A1 | 11/1986 |
| WO | 2010/068890 A1 | 6/2010 |
| WO | 2013/029157 A1 | 3/2013 |
| WO | 2014/195846 A1 | 12/2014 |
| WO | 2014/195893 A1 | 12/2014 |
| WO | 2016/001818 A1 | 1/2016 |
| WO | 2016/001819 A1 | 1/2016 |
| WO | 2016/001854 A1 | 1/2016 |
| WO | 2016/001857 A1 | 1/2016 |

OTHER PUBLICATIONS

Extended European Search Report for corresponding European Patent No. 17859426.3 dated Apr. 21, 2020, 10 pages.

* cited by examiner

FERRULE ASSEMBLY, METHOD FOR MANUFACTURING A FERRULE ASSEMBLY AND OPTICAL FIBER FIXING MOLD

This application is a National Stage Application of PCT/PCT/IB2017/001387, filed 9 Oct. 2017, which claims benefit of Serial No. 201610889090.3, filed 11 Oct. 2016 in China and which applications are incorporated herein by reference. A claim of priority is made to each of the above disclosed applications.

FIELD

Embodiments of the present disclosure generally relate to the field of optical fiber connectors, and more specifically, to a method for manufacturing a ferrule assembly in the optical fiber connector, a ferrule assembly manufactured by the method, and an optical fiber fixing module for manufacturing the high-precision ferrule assembly.

BACKGROUND

Ferrules are known in the optical fiber connectors. The ferrule is a core component of the optical fiber connector and is a high-precision element manufactured by high-precision process technology. During the manufacture process of the optical fiber connector, the stripped and cleaned bare optical fiber usually passes through an inner hole of the optical connector filled with glue, and then the glue is cured to fixate the optical fiber in the ferrule. Afterwards, the desired optical fiber connector is made through a series of programs, e.g., grinding, polishing and testing and the like. Because all manufacture process causes inevitable errors and tolerance is artificially introduced for the sake of dimension matching/assembly requirements, e.g., the diameter of the inner hole should be greater than the outer diameter of the optical fiber to allow the optical fiber to enter the inner hole, a priori offset is required for the outer diameter of the optical fiber and the dimension of the inner hole. For another example, decentration is present between the axle center of the optical fiber and the inner hole due to a gap therebetween and a manufacturing error exists between the inner hole and the alignment benchmark (mainly indicate the outer diameter of the ferrule for the connector that takes excircle as the alignment benchmark). These factors will cause lateral shift of the axle center of the optical fiber, so as to influence insertion loss upon engagement of the optical fiber connector.

SUMMARY

In general, embodiments of the present disclosure provide a method for manufacturing a low loss ferrule assembly with prefabricated optical fibers, and a low loss ferrule assembly with prefabricated optical fibers manufactured by the method, and an optical fiber fixing mold used for manufacturing the ferrule assembly.

Regarding this, the first aspect of the present disclosure presents a method for manufacturing a high-precision ferrule assembly, comprising: disposing both ends of a plurality of optical fibers respectively within a plurality of grooves at both ends of an optical fiber fixing mold, such that the plurality of optical fibers maintain a specific distance therebetween; disposing the plurality of optical fibers within a housing, and causing the plurality of optical fibers to be fixed relative to the housing, wherein the housing is a split type; cutting and polishing the optical fibers at a first side of the housing.

In this aspect, disposing both ends of a plurality of optical fibers respectively within a plurality of grooves at both ends of an optical fiber fixing mold comprises: disposing a plurality of optical fibers having a cladding layer into a fixture; at least stripping off the cladding layer of a cut and polished end of both ends of the plurality of optical fibers to expose the fiber cores; disposing the fixture into an opening of the optical fiber fixing mold, wherein a plurality of pairs of corresponding grooves are provided on opposite two sections of the optical fiber fixing mold; applying a tensile force at both ends of the plurality of optical fibers, such that the optical fibers are drawn straight and both ends of each optical fiber are disposed within a pair of corresponding grooves, respectively.

In this aspect, it also comprises: generating a plurality of grooves in the optical fiber fixing mold through nanometer etching, such that the plurality of grooves maintain a specific distance therebetween, wherein the grooves are V-shaped grooves or U-shaped grooves.

In this aspect, disposing the plurality of optical fibers within a housing, such that the plurality of optical fibers are fixed relative to the housing comprising: disposing guiding elements at two sides of the plurality of optical fibers; removing the fixture, and mounting the plurality of optical fibers and guide elements in the housing; filling a curable body into a gap between the optical fiber and the housing; curing the curable body through ultraviolet irradiation, such that the optical fiber is fixed relative to the housing; removing the guide elements.

In this aspect, filling a curable body into a gap between the optical fiber and the housing comprises: filling the curable body into the gap between the optical fiber and the housing by injection manner and/or using a capillary phenomenon.

In this aspect, the curable body is epoxy resin.

In this aspect, the optical fibers having a cladding layer have a first predetermined length; and fiber cores exposed at both ends of the optical fiber have a second predetermined length.

In this aspect, an error of the specific distance meets the precision requirement of the distance between optical fibers in the ferrule assembly.

A second aspect of the present disclosure provides a method for manufacturing a high-precision ferrule assembly, comprising: at least stripping off the cladding layer of a cut and polished end of both ends of the plurality of optical fibers to expose the fiber cores; inserting a plurality of optical fibers into an optical fiber hole of a housing, and inserting a guide element into the guide hole of the housing, wherein the housing is of an integral type; disposing both ends of the plurality of optical fibers respectively into a plurality of grooves at two ends of the optical fiber fixing mold, such that the plurality of optical fibers maintain a specific distance therebetween; causing the plurality of optical fibers to be fixed relative to the housing; cutting and polishing the optical fibers at a first side of the housing.

In this aspect, disposing both ends of the plurality of optical fibers respectively into a plurality of grooves at two ends of the optical fiber fixing mold comprises: disposing the housing inserted with the optical fibers and guide element into an opening of the optical fiber fixing mold, wherein a plurality of pairs of corresponding grooves are provided on two opposite sections of the optical fiber fixing mold; applying a tensile force to both ends of the plurality of optical fibers, such that the optical fibers are drawn straight and the two ends of each optical fiber are disposed within a pair of corresponding grooves, respectively.

In this aspect, it also comprises: generating a plurality of grooves in the optical fiber fixing mold through nanometer etching such that the plurality of grooves maintain a specific distance, wherein the grooves are V-shaped grooves or U-shaped grooves.

In this aspect, wherein causing the plurality of optical fibers to be fixed relative to the housing comprises: filling a curable body in a gap between the optical fiber and the housing; curing the curable body through ultraviolet irradiation, such that the optical fiber is fixed relative to the optical fiber.

In this aspect, wherein filling a curable body in a gap between the optical fiber and the housing comprises: filling a curable body into the gap between the optical fiber and the housing by injection and/or using a capillary phenomenon.

In this aspect, wherein the curable body is epoxy resin.

In this aspect, wherein the optical fibers having a cladding layer have a first predetermined length; and fiber cores exposed at both ends of the optical fiber have a second predetermined length.

In this aspect, wherein an error of the specific distance meets the precision requirement of the distance between optical fibers in the ferrule assembly.

In this aspect, the guide element is used for guiding the housing to align with the optical fiber fixing mold, such that the optical fibers in the housing is aligned with grooves on the optical fiber fixing mold.

A third aspect of the present disclosure provides a high-precision ferrule assembly, wherein the ferrule assembly is manufactured according to the method of any of the above aspects.

A fourth aspect of the present disclosure provides an optical fiber fixing mold for manufacturing the high-precision ferrule assembly, comprising: a mainboard having an opening in a middle of the mainboard; a plurality of grooves for disposing optical fibers to calibrate positions between a plurality of optical fibers.

In this aspect, it also comprises: a fastening member for pressing the optical fibers onto the mainboard.

In this aspect, the plurality of grooves is equidistantly provided on a first section and a second section of the mainboard, and the grooves on the first section exactly correspond to the grooves on the second section.

In this aspect, the grooves are V-shaped grooves or U-shaped grooves.

In this aspect, an error of spacing between the plurality of grooves meets precision requirements on the inter-optical fiber distance in the ferrule assembly.

In this aspect, the grooves are generated through nanometer etching.

The solution provided by the present disclosure implements the ferrule assembly of the high-precision optical fiber connector with low costs. The method is simple and effective and has use value.

Through the descriptions of the present disclosure with reference to the drawings, other objectives and advantages of the present disclosure become apparent, which can help obtain a comprehensive understanding of the present disclosure.

BRIEF DESCRIPTION OF THE DRAWINGS

Through the detailed description of the non-restrictive embodiments with reference to the following drawings, other features, objectives and advantages of the present disclosure will become more apparent.

DETAILED DESCRIPTION OF EMBODIMENTS

In the detailed description of the preferred embodiments below, reference is made to the attached drawings that constitute a part of the present disclosure. The attached drawings illustrate specific embodiments that can implement the present disclosure by way of examples. The example embodiments do not aim to exhaustively disclose all embodiments of the present disclosure. It can be understood that other embodiments can be utilized without deviating from the scope of the present disclosure, and structural or logic modifications can be made. Therefore, the following detailed description is not restrictive and the scope of the present disclosure is defined by the attached claims.

As used herein, the term "includes" and its variants are to be read as open-ended terms that mean "includes, but is not limited to." The term "based on" is to be read as "based at least in part on." The term "one embodiment" is to be read as "at least one embodiment." The term "a further embodiment" is to be read as "at least one further embodiment." Definitions related to other terms will be provided in the following description.

To cover the shortage of production and manufacture field of optical fiber connectors, the present disclosure recommends a simple and effective method for manufacturing a high precision ferrule assembly. The basic idea of the method is causing optical fibers in the ferrule assembly to maintain a specific distance therebetween by a plurality of grooves in the optical fiber fixing mold, and then fixating the optical fibers inside a housing of the ferrule assembly via a curable body. As the groove of the optical fiber fixing mold is made by nanometer etching, the distance between the grooves can keep at a very high precision, which greatly reduces machining error of the ferrule assembly of the optical fiber connector. We will explain the present in details below.

Figure 1:
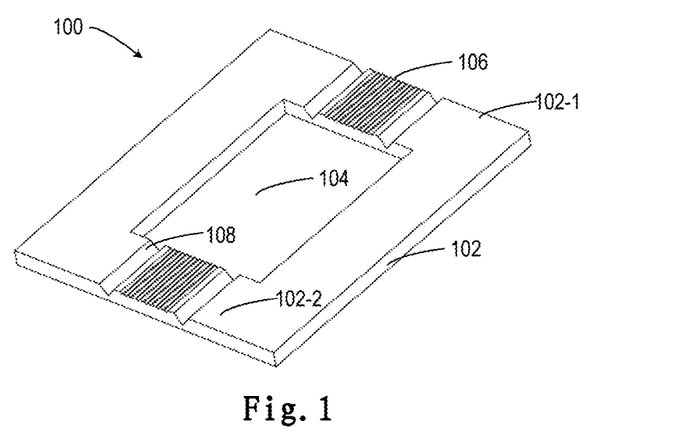
FIG. 1 illustrates an optical fiber fixing mold for manufacturing a high-precision ferrule assembly according to the present disclosure.

While introducing a method for manufacturing a high-precision ferrule assembly, we will first introduce an optical fiber fixing mold 100 for manufacturing a high-precision ferrule assembly. As shown in FIG. 1, the optical fiber fixing mold 100 comprises a mainboard 102 having an opening 104 in the middle. In some embodiments, the mainboard 102 and the opening 104 are rectangular shaped.

A first section 102-1 and a second section 102-2 of the mainboard 102 comprise slots 106 disposed equidistantly, and a plurality of grooves 106 of the first section 102-1 and a plurality of grooves 106 of the second section 102-2 are respectively aligned, such that when both ends of the optical fiber are placed on the grooves 106, the optical fibers can maintain a specific distance therebetween. In a specific embodiment, both ends of the optical fiber placed in the grooves 106 respectively are: a cladding layer-removed bare fiber core and a fiber core with a cladding layer. In another specific embodiment, both ends of the optical fiber placed in the grooves 106 are cladding layer-removed bare fiber cores.

To maintain the inter-optical fiber distance at a higher precision, the grooves are made by nanometer etching technology, so the distance between the grooves has an extremely high precision. In some embodiments, the distance between the grooves 106 is set according to the fiber core distance required by the ferrule assembly specification, i.e., the error of the distance between a plurality of grooves complies with the precision requirement for inter-optical fiber distance in the ferrule assembly. In some embodiments, the grooves 106 are U-shaped grooves or V-shaped grooves.

In some embodiments, the optical fiber fixing mold 100 also comprises a fastening member (not shown) for pressing a bare fiber core or a fiber core with a cladding layer onto the mainboard 102, which assists the optical fiber fixing mold 100 to firmly hold onto the optical fiber.

In some embodiments, the first section 102-1 and the second section 102-2 of the optical fiber fixing mold 100 also comprise two pairs of guide grooves 108 respectively disposed at two sides of the plurality of grooves 106. The guide grooves 108 are used for locating positions of guide elements, such that the located guide elements can align the housing with the optical fiber fixing mold 100. The guide grooves 108 can be U-shaped grooves or V-shaped grooves.

Figure 2:
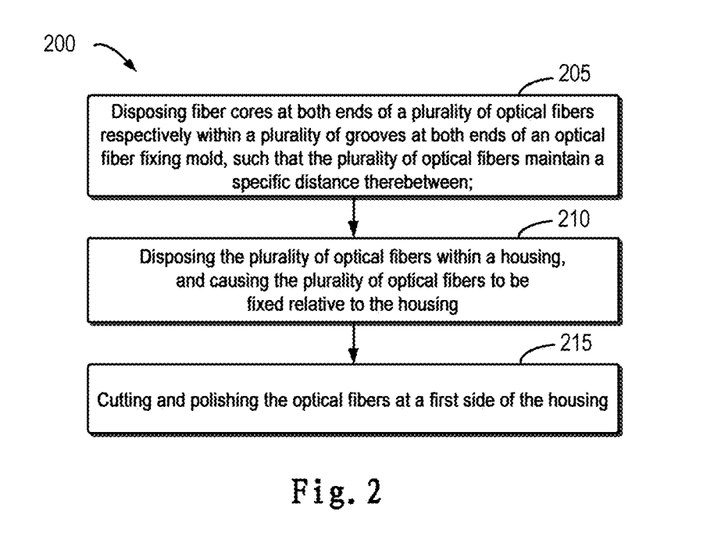
FIG. 2 illustrates a flowchart of a method for manufacturing a high-precision ferrule assembly according to the present disclosure.

The method for manufacturing a high-precision ferrule assembly using the above optical fiber fixing mold 100 according to the present disclosure will be introduced in details. FIG. 2 illustrates a flowchart of a method for manufacturing a high-precision ferrule assembly according to the present disclosure.

As shown, both ends of a plurality of optical fibers are placed within a plurality of grooves 106 at both ends of the optical fiber fixing mold 100 at step 205, such that the plurality of optical fibers maintains a specific distance therebetween. Because the grooves 106 are made by nanometer etching, the optical fibers can be accurately located through the grooves. The grooves are U-shaped grooves or V-shaped grooves.

Figure 6:
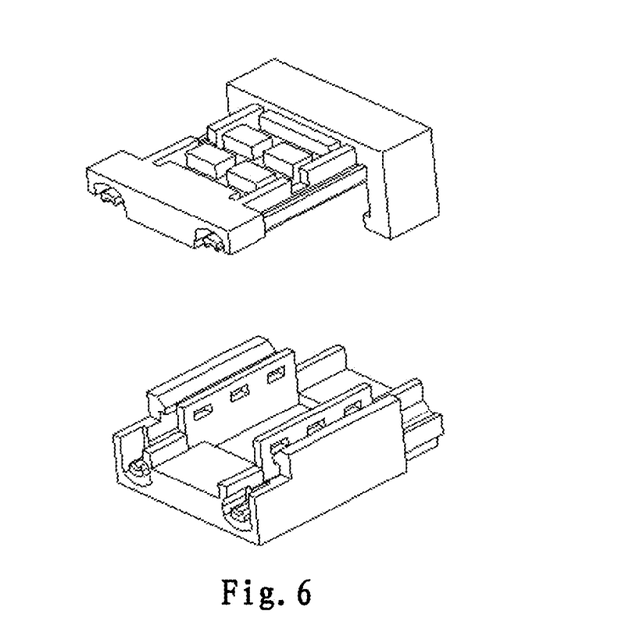
FIG. 6 illustrates a split type housing according to the present disclosure.

At step 210, the plurality of optical fibers is disposed in the housing, such that the plurality of optical fibers is fixed relative to the housing. Specifically, the optical fibers located via grooves can be fixated in the housing of the ferrule assembly through a curable body, so as to ensure that the position of the optical fiber in the ferrule assembly has a higher precision, wherein the housing is a split type and can be split into an upper part and a lower part as shown in FIG. 6. The upper part and the lower part can form an integral housing through a latching member in the housing.

At step 215, the optical fibers at a first side of the housing are cut and polished. To be specific, the optical fiber at an interface port of the fiber core is clipped and the optical fiber at the clipped side is polished, so as to generate a high-precision ferrule assembly.

Figure 3:
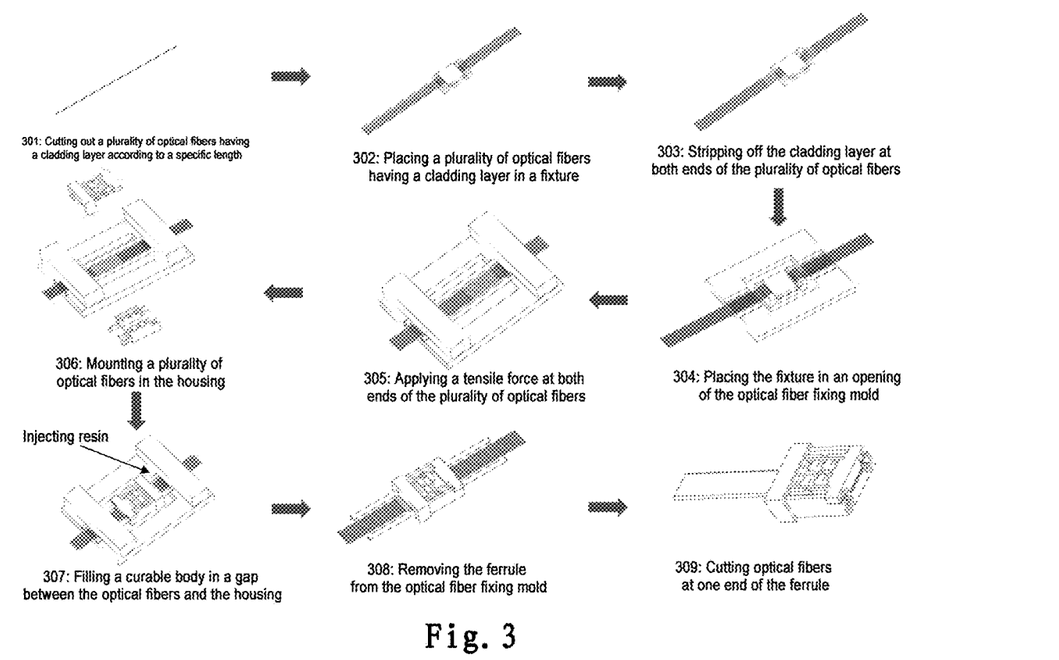
FIG. 3 illustrates a schematic diagram of a flow of for manufacturing a high-precision ferrule assembly according to the present disclosure.

Steps 205, 210 and 215 will be further elaborated through a specific embodiment with reference to FIG. 3.

At step 301, a plurality of optical fibers having a cladding layer is cut out according to a specific length, wherein the length can be set based on the dimension of the optical fiber fixing mold, for example, the length is at least greater than a length of the mainboard of the optical fiber fixing mold. In some embodiments, the optical fiber having a cladding layer has a diameter of 200 µm.

At step 302, a plurality of optical fibers having a cladding layer is placed in a fixture. This step mainly functions as preliminarily locating distance between optical fibers and maintaining the optical fibers by the fixture, to facilitate moving the optical fibers. To be specific, a middle portion of the plurality of optical fibers having cladding layer is clamped by the fixture, such that the optical fibers are fixated at a spacing distance. It can be appreciated that the spacing distance between the optical fibers has certain errors as the precision of the fixture is not high enough. In some embodiments, the distance is 0.25 mm.

At step 303, at least strip off a cladding layer of a cut and polished end in both ends of the plurality of optical fibers to expose a fiber core. Specifically, a cladding layer of at least one of the both ends of the plurality optical fibers is stripped off, such that the fiber core exposed has a predetermined length. In some embodiments, the fiber core, after removing the cladding layer, has a diameter of 125 µm. In some embodiments, the cladding layers at both ends of the optical fiber are stripped off.

At step 304, the fixture is placed in the opening of the optical fiber fixing mold. To be specific, the fixture holding a plurality of optical fibers is placed in the opening of the optical fiber fixing mold, such that both ends of the optical fibers are respectively disposed on the grooves of the first section and the second section of the optical fiber fixing mold, wherein the grooves on the first section and the second section is in one-to-one correspondence.

In a specific embodiment, the both ends of the optical fiber respectively are: a cladding layer-removed bare fiber core and a fiber core with cladding layer. In another specific embodiment, both ends of the optical fibers are cladding layer-removed bare fiber cores.

At step 305, a tensile force is applied at both ends of the plurality of optical fibers, such that the optical fibers are drawn straight and both ends of each optical fiber are disposed within a pair of corresponding grooves, respectively. Specifically, a tensile force parallel with the mainboard of the optical fiber fixing mold is applied at both ends of the optical fibers, such that the optical fibers are in a strained state and the fiber cores respectively fall in one groove by means of the tension on the fiber core. Then the fixture is removed and guide elements are mounted within the guide grooves at both ends of the plurality of optical fibers. In some specific embodiments, the optical fibers may be pressed onto the mainboard by the fastening member of the optical fiber fixing mold, so as to ensure that the optical fibers can be disposed in the grooves.

At step 306, the plurality of optical fibers and guide elements are mounted in the housing. To be specific, the housing consists of two parts, i.e., an upper housing and a lower housing. The two parts of the housing are engaged respectively from an upper side and a lower side of the opening of the optical fiber fixing mold, so as to dispose the optical fibers and the guide elements in the housing, thereby acquiring an assembled ferrule assembly; wherein the guide elements enable the housing to correctly align with the optical fiber fixing mold, such that the optical fibers are mounted in a correct position of the housing.

At step 307, the curable body is filled in a gap between the optical fiber and the housing. Specifically, the curable body is filled into the gap between the optical fiber and the housing by injection manner and/or using a capillary phenomenon. In some embodiments, an injection hole can be disposed above the upper housing, which injection hole is connected with a gap between the optical fiber and the housing for injecting the curable body into the gap between the optical fiber and the housing. The curable body is liquid form and can be cured through further processing (e.g., ultraviolet irradiation or heating). In some embodiments, the curable body is epoxy resin (Epoxy). To avoid changing the position of the optical fiber in the ferrule assembly due to movement, the ferrule assembly that has been injected with the curable body is irradiated by ultraviolet to pre-cure the curable body, such that the position of the optical fiber is roughly fixated.

At step 308, the ferrule assembly is removed from the optical fiber fixing mold and the curable body is further cured by ultraviolet.

At step 309, the guide elements are removed from the ferrule assembly and an end of the ferrule assembly is further cut, such the cut fiber optical fiber is flush with a housing face of the housing. The optical fiber at the cut side is finally polished to manufacture a high-precision ferrule assembly, wherein the cladding layer of the optical fiber at the cut and polished end has been stripped off.

Figure 4:
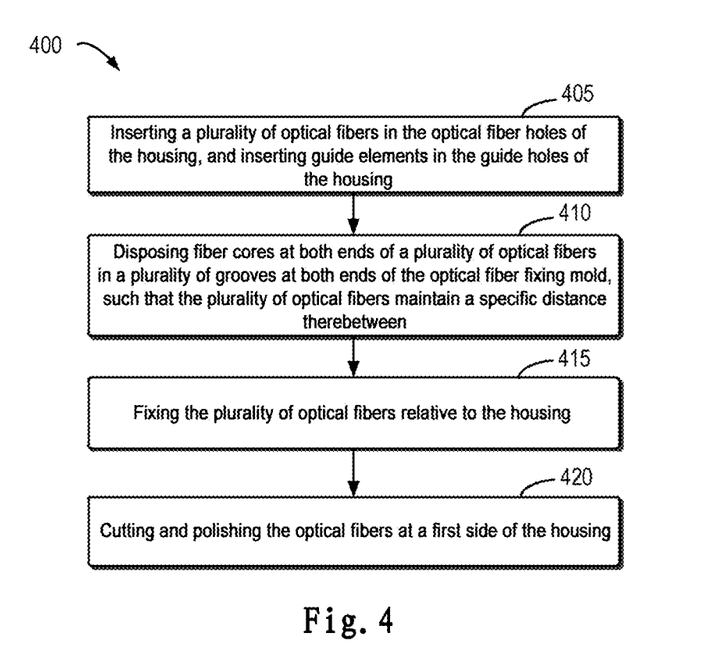
FIG. 4 illustrates a flowchart of a further method for manufacturing a high-precision ferrule assembly according to the present disclosure.

The housing in the above solution is of a split type, i.e., the housing is comprised with an upper part and a lower part. Therefore, during the process of manufacture, the position of the optical fiber is first set and the housing is mounted afterwards. Next, we will introduce a method for manufacturing a high-precision ferrule assembly with respect to an integral housing. Because the housing is of an integral type, the method needs to first insert the optical fiber into the housing and then adjust the position of the optical fiber. The details are as below:

FIG. 4 illustrates a flowchart of a method for manufacturing a high-precision ferrule assembly according to the present disclosure.

Figure 7:
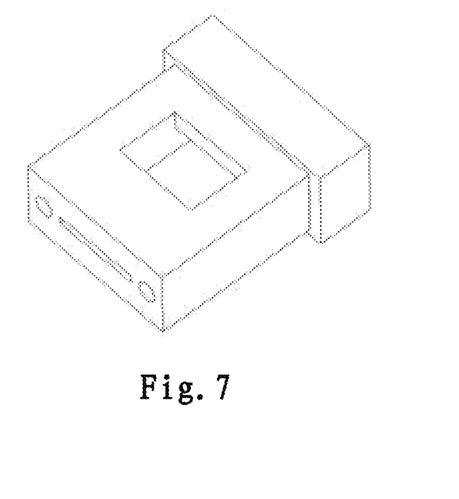
FIG. 7 illustrates an integral type housing according to the present disclosure.

As shown, a plurality of optical fibers is inserted in the optical fiber holes of the housing at step 405, and the guide elements are inserted in the guide holes of the housing, wherein the housing is of an integral type as shown in FIG. 7, and the optical fibers need to pass through the optical fiber holes of the housing, so as to dispose the optical fibers in the housing.

At step 410, both ends of a plurality of optical fibers are placed within a plurality of grooves 106 at both ends of the optical fiber fixing mold 100, such that the plurality of optical fibers maintains a specific distance therebetween. In a specific embodiment, the both ends of the optical fibers disposed in the grooves 106 respectively are: a cladding layer-removed bare fiber core and a fiber core with a cladding layer. In another specific embodiment, both ends of the optical fibers placed in the grooves 106 are cladding layer-removed bare fiber cores. Because the grooves 106 are made by nanometer etching, the optical fibers can be accurately located through the grooves. The grooves are U-shaped grooves or V-shaped grooves.

At step 415, the plurality of optical fibers is fixed relative to the housing. Specifically, the optical fibers located via grooves can be fixated in the housing of the ferrule assembly through a curable body, so as to ensure that the position of the optical fiber in the ferrule assembly has a higher precision.

At step 420, the optical fibers at a first side of the housing are cut and polished. To be specific, the optical fiber at an interface port of the fiber core is clipped and the optical fiber at the clipped side is polished, so as to generate a high-precision ferrule assembly.

Figure 5:
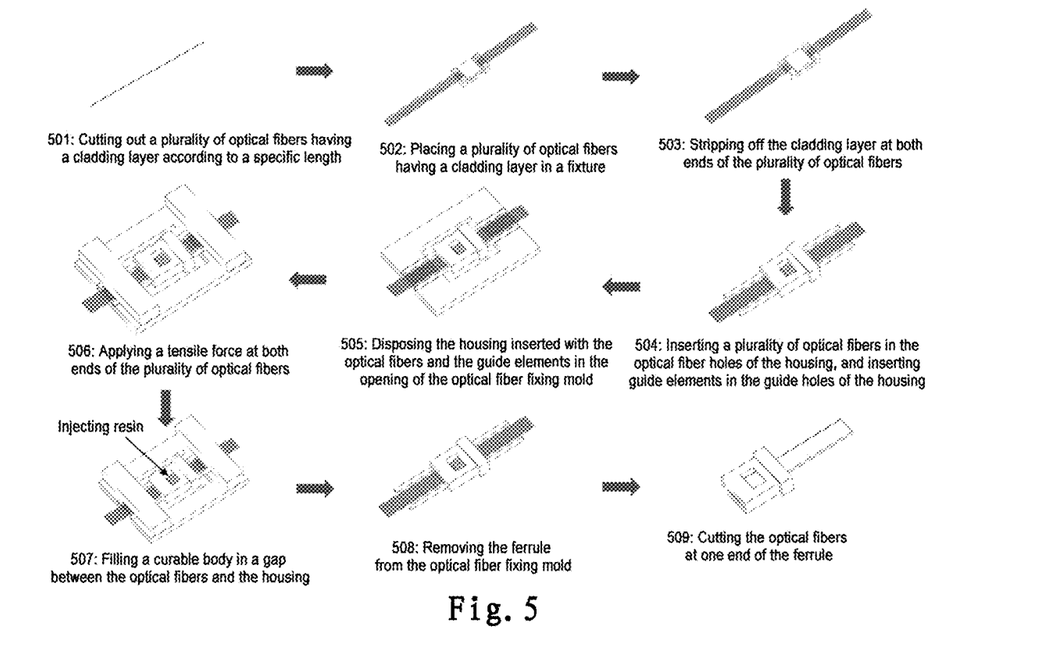
FIG. 5 illustrates a schematic diagram of a further flow for manufacturing a high-precision ferrule assembly according to the present disclosure.

Steps 405, 410, 415 and 420 will be further elaborated through a specific embodiment with reference to FIG. 5.

At step 501, a plurality of optical fibers having a cladding layer is cut out according to a specific length, wherein the length can be set based on the dimension of the optical fiber fixing mold, for example, the length is at least greater than a length of the mainboard of the optical fiber fixing mold. In some embodiments, the optical fiber having a cladding layer has a diameter of 200 µm.

At step 502, a plurality of optical fibers having a cladding layer is placed in a fixture. This step mainly functions as preliminarily locating distance between optical fibers and maintaining the optical fibers by the fixture, to facilitate moving the optical fibers. To be specific, a middle portion of the plurality of optical fibers having a cladding layer is clamped by the fixture, such that the optical fibers are fixated at a spacing distance. It can be appreciated that the spacing distance between the optical fibers has certain errors as the precision of the fixture is not high enough. In some embodiments, the distance is 0.25 mm.

At step 503, at least strip off a cladding layer of a cut and polished end in both ends of the plurality of optical fibers to expose a fiber core. Specifically, a cladding layer of at least one of the both ends of the plurality optical fibers is stripped off, such that the fiber core exposed at both ends of the optical fiber has a predetermined length. In some embodiments, the fiber core, after removing the cladding layer, has a diameter of 125 µm. In some embodiments, the cladding layers at both ends of the optical fiber are stripped off.

At step 504, the fixture is removed, a plurality of optical fibers are inserted in the optical fiber holes of the housing, and the guide elements are inserted in the guide holes of the housing. Specifically, because the optical fibers have been roughly located through the fixture, the optical fibers held by the fixture can be substantially aligned and inserted into the optical fiber holes of the integral housing. However, the spacing distance between the optical fibers is not precise enough.

At step 505, the housing inserted with the optical fibers and the guide elements are disposed in the opening of the optical fiber fixing mold, such that both ends of the optical fibers are respectively placed on the grooves of the first section and the second section of the optical fiber fixing mold, and the guide elements are placed on the guide grooves of the first section and the second section of the optical fiber fixing mold, wherein the grooves and the guide grooves on the first section and the second section are in one-to-one correspondence. The guide elements are to guide the housing to align with the optical fiber fixing mold, such that the optical fibers in the housing are aligned with the grooves on the optical fiber fixing mold.

In a specific embodiment, both ends of the optical fiber respectively are: a cladding layer-removed bare fiber core and a fiber core with cladding layer. In another specific embodiment, both ends of the optical fiber are cladding layer-removed bare fiber cores.

At step 506, a tensile force is applied at both ends of the plurality of optical fibers, such that the optical fibers are drawn straight and both ends of each optical fiber are disposed within a pair of corresponding grooves, respectively. Specifically, a tensile force parallel with the mainboard of the optical fiber fixing mold is applied at both ends of the optical fibers, such that the optical fibers are in a strained state and the fiber cores respectively fall in one groove by means of the tension on the fiber core. In some specific embodiments, the optical fibers may be pressed onto the mainboard by the fastening member of the optical fiber fixing mold, so as to ensure that the optical fibers can be disposed in the grooves.

At step 507, the curable body is filled in a gap between the optical fiber and the housing. Specifically, the curable body is filled into the gap between the optical fiber and the housing by injection manner and/or using a capillary phenomenon. In some embodiments, an injection hole can be disposed above the upper housing, which injection hole is connected with a gap between the optical fiber and the housing for injecting the curable body into the gap between the optical fiber and the housing. The curable body is liquid form and can be cured through further processing (e.g., ultraviolet irradiation or heating). In some embodiments, the curable body is epoxy resin (Epoxy). To avoid changing the position of the optical fiber in the ferrule assembly due to movement, the ferrule assembly that has been injected with the curable body is irradiated with ultraviolet to pre-cure the curable body, such that the position of the optical fiber is roughly fixated.

At step 508, the ferrule assembly is removed from the optical fiber fixing mold and the curable body is further cured by ultraviolet.

At step 509, the guide elements are removed from the ferrule assembly and an end of the ferrule assembly is further cut, such the cut fiber optical fiber is flush with a housing face of the housing. The optical fiber at the cut side is finally polished to manufacture a high-precision ferrule assembly, wherein the cladding layer of the optical fiber at the cut and polished end has been stripped off.

Further, although operations are described in a particular order, it should not be appreciated that it requires that these operations are necessarily performed according to this particular sequence, or a desired outcome can only be achieved by performing all shown operations. In some cases, multi-tasking or parallel processing is beneficial. Likewise, although the above discussion comprises some specific implementation details, they should not be interpreted as restrictions on the scope of any invention of claims. Instead, they should be interpreted as descriptions for a specific embodiment of a specific invention. Some features described in the context of separate embodiments of the present description can be merged in a single embodiment. On the contrary, various features described in the context of the single embodiment can be separately implemented in a plurality of embodiments or any suitable sub-combinations.

For those skilled in the art, it is apparent that the present disclosure is not limited to the details of the above exemplary embodiments, and the embodiments of the present disclosure can be implemented by other specific forms without deviating from the principle or basic features of the present disclosure. Therefore, the embodiments should be regarded as exemplary and non-restrictive anyway. Besides, it is obvious that the term "include" does not exclude other elements and steps and the expression "one" does not exclude plural forms. The plurality of elements stated in the device claims can be implemented by one element. The words "first" and "second" only represent the names and do not indicate any particular order.

What is claimed is:

1. A method for manufacturing a high-precision ferrule assembly, comprising:
    disposing fiber cores of a plurality of optical fibers within a plurality of grooves at each of two ends of an optical fiber fixing mold, such that the plurality of optical fibers maintain a specific distance therebetween;
    disposing the plurality of optical fibers within a housing positioned within an opening of the optical fiber fixing mold, the opening being positioned between the grooves of one of the ends and the grooves of the other of the ends, and causing the plurality of optical fibers to be fixed relative to the housing; and
    cutting and polishing the optical fibers at a first side of the housing.

2. The method according to claim 1, wherein disposing the fiber cores includes:
    disposing a plurality of cladded optical fibers having a cladding layer into a fixture;
    stripping off the cladding layer at both ends of the plurality of cladded optical fibers to expose the fiber cores;
    disposing the fixture into the opening of the optical fiber fixing mold; and
    applying a tensile force at both ends of the plurality of optical fibers, such that the optical fibers are drawn straight within the grooves on opposite sides of the opening.

3. The method according to claim 1, further comprising:
    generating the plurality of grooves in the optical fiber fixing mold through nanometer etching, such that the plurality of grooves maintain a specific distance therebetween, wherein the plurality of grooves are V-shaped grooves or U-shaped grooves.

4. The method according to claim 2, wherein disposing the plurality of optical fibers within a housing includes:
    disposing guide elements at two sides of the plurality of optical fibers;
    removing the fixture, and mounting the plurality of optical fibers and guide elements in the housing;
    filling a curable body into a gap between the plurality of optical fibers and the housing;
    curing the curable body through ultraviolet irradiation, such that the plurality of optical fibers are fixed relative to the housing; and
    removing the guide elements.

5. The method according to claim 4, wherein filling a curable body includes:
    filling the curable body into the gap between the plurality of optical fibers and the housing by injection or by using a capillary phenomenon.

6. The method according to claim 4, wherein the curable body is epoxy resin.

7. A high-precision ferrule assembly, wherein the ferrule assembly is manufactured according to a method of claim 1.

8. The method of claim 1, wherein the housing is a split type housing.

9. A method of manufacturing a high-precision ferrule assembly, comprising:
    inserting a plurality of optical fibers into at least one optical fiber hole of a housing;
    positioning fiber cores of the plurality of optical fibers into a plurality of grooves at each of two ends of an optical fiber fixing mold, such that the plurality of optical fibers maintain a specific distance therebetween, and such that the housing is positioned within an opening of the optical fiber fixing mold, the opening being positioned between the grooves of one of the ends and the grooves of the other of the ends;
    causing the plurality of optical fibers to be fixed relative to the housing; and
    cutting and polishing the optical fibers at a first side of the housing.

10. The method according to claim 9,
wherein the grooves are provided on two opposite sections of the optical fiber fixing mold on opposite sides of the opening of the optical fiber fixing mold; the method further including:
applying a tensile force to both ends of the plurality of optical fibers, such that the plurality of optical fibers are drawn straight within the grooves on both of the two opposite sections.

11. The method according to claim 10, further comprising:
generating the plurality of grooves in the optical fiber fixing mold through nanometer etching such that the plurality of grooves maintain a specific distance, wherein the plurality of grooves are V-shaped grooves or U-shaped grooves.

12. The method according to claim 10, wherein causing the plurality of optical fibers to be fixed relative to the housing, includes:
filling a curable body in a gap between the plurality of optical fibers and the housing; and
curing the curable body through ultraviolet irradiation, such that the plurality of optical fibers are fixed relative to the housing.

13. The method according to claim 12, wherein filling a curable body, includes:
filling the curable body into the gap by injection and/or by use of a capillary phenomenon.

14. The method according to claim 12, wherein the curable body is epoxy resin.

15. The method of claim 9, wherein the housing is an integral type housing.

16. A method, comprising:
providing a mainboard, the mainboard including pairs of aligned grooves on opposite sides of an opening of the mainboard;
positioning optical fibers in the grooves on both of the opposite sides of the opening;
positioning a ferrule housing in the opening such that portions of the optical fibers are positioned within the ferrule housing;
applying a tensile force to the optical fibers in the grooves on both of the opposite sides of the opening;
fixing the optical fibers relative to the ferrule housing; and
cutting the optical fibers at a first side of the ferrule housing.

17. The method of claim 16, wherein the fixing the optical fibers includes injecting an adhesive into the ferrule housing and curing the adhesive.

18. The method of claim 16, wherein the housing is a split-type housing, and the method includes connecting portions of the ferrule housing to each other about the optical fibers.

19. A method, comprising:
providing a mainboard, the mainboard including pairs of aligned grooves on opposite sides of an opening of the mainboard;
positioning portions of optical fibers in a ferrule housing;
positioning the ferrule housing in the opening;
positioning other portions of the optical fibers in the grooves on both of the opposite sides of the opening;
applying a tensile force to the optical fibers in the grooves on both of the opposite sides of the opening;
fixing the optical fibers relative to the ferrule housing; and
cutting the optical fibers at a first side of the ferrule housing.

20. The method of claim 19, wherein the fixing the optical fibers includes injecting an adhesive into the ferrule housing and curing the adhesive.

21. The method of claim 19, wherein the housing is an integral-type housing.

22. The method of claim 19, further comprising inserting guide elements into the housing on opposite sides of the optical fibers.

23. The method of claim 22, further comprising positioning the guide elements in aligned guide element grooves defined by the mainframe on both of the opposite sides of the opening, the aligned guide element grooves being sized differently than the aligned grooves.

* * * * *